(12) United States Patent
Kim et al.

(10) Patent No.: US 8,887,180 B2
(45) Date of Patent: Nov. 11, 2014

(54) DISPLAY DEVICE, ELECTRONIC DEVICE HAVING THE SAME, AND METHOD THEREOF

(75) Inventors: Deuk-Soo Kim, Suwon-si (KR);
Kun-Bin Lee, Suwon-si (KR);
Hyeong-Cheol Ahn, Suwon-si (KR);
Dong-Won Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 1149 days.

(21) Appl. No.: 11/930,253

(22) Filed: Oct. 31, 2007

(65) Prior Publication Data

US 2008/0196047 A1 Aug. 14, 2008

(30) Foreign Application Priority Data

Feb. 12, 2007 (KR) ........................ 10-2007-0014370

(51) Int. Cl.
*G06F 3/00* (2006.01)
*G06F 9/44* (2006.01)
*G06F 9/46* (2006.01)
*G06F 13/00* (2006.01)
*G06F 3/044* (2006.01)
*G06F 3/041* (2006.01)

(52) U.S. Cl.
CPC ................................. *G06F 3/0412* (2013.01);
*G06F 3/044* (2013.01)
USPC ............ 719/321; 719/318; 719/322; 719/327

(58) Field of Classification Search
None
See application file for complete search history.

(56) References Cited

U.S. PATENT DOCUMENTS

| 5,990,629 | A | * | 11/1999 | Yamada et al. | ............ 315/169.3 |
| 6,473,059 | B1 | | 10/2002 | Yasue | |
| 7,304,621 | B2 | * | 12/2007 | Oomori et al. | .................. 345/82 |
| 2004/0201556 | A1 | | 10/2004 | Oomori et al. | |
| 2006/0034326 | A1 | * | 2/2006 | Anderson et al. | ............. 370/466 |
| 2006/0214902 | A1 | * | 9/2006 | Tamura | ......................... 345/100 |

FOREIGN PATENT DOCUMENTS

| JP | 08-179718 | 7/1996 |
| JP | 2001-034374 | 2/2001 |
| JP | 2002-108314 | 4/2002 |
| JP | 2003229953 | 8/2003 |
| JP | 2004325747 | 11/2004 |
| JP | 2005-010638 | 1/2005 |
| JP | 2005-265939 | 9/2005 |
| JP | 2006-276221 | 10/2006 |
| KR | 1020010039730 A | 5/2001 |
| KR | 1020050057702 A | 6/2005 |
| KR | 1020060007278 A | 1/2006 |
| KR | 1020060032259 A | 4/2006 |
| KR | 1020060096739 A | 9/2006 |
| KR | 1020060102609 | 9/2006 |
| KR | 1020060103851 A | 10/2006 |

* cited by examiner

*Primary Examiner* — H S Sough
*Assistant Examiner* — Craig Dorais
(74) *Attorney, Agent, or Firm* — Cantor Colburn LLP

(57) ABSTRACT

An electronic device includes a central processing unit ("CPU"), first and second display panels, and first and second display panel drivers. The CPU provides an image signal and an input control signal. The first and second display panels respectively display images. The first and second display panel drivers drive the first and second display panels according to the image signal and the input control signal. The CPU includes an interface transmission unit outputting an interface signal to control the first and second display panel drivers. The first and second display panel drivers respectively include first and second interface receiving units receiving the interface signal from the interface transmission unit. The interface signal includes a display panel selection bit and a data bit.

8 Claims, 4 Drawing Sheets

DISPLAY DEVICE, ELECTRONIC DEVICE HAVING THE SAME, AND METHOD THEREOF

This application claims priority to Korean Patent Application No. 10-2007-0014370, filed on Feb. 12, 2007, and all the benefits accruing therefrom under 35 U.S.C. §119, and the contents of which in its entirety are herein incorporated by reference.

BACKGROUND OF THE INVENTION (a) Field of the Invention

The present invention relates to a display device, an electronic device having the same, and a method thereof. More particularly, the present invention relates to a display device having spatial limitations solved and reducing electrostatic damage ("ESD") therein, an electronic device having the display device, and a method of controlling the electronic device.

(b) Description of the Related Art

In recent years, as a substitute for heavy and large cathode ray tubes ("CRTs"), flat panel displays, such as organic light emitting diode ("OLED") displays, plasma display panels ("PDPs"), and liquid crystal displays ("LCDs") have been actively developed.

The PDPs display text or images using plasma generated by gas discharge. The OLED displays display text or images using field emission of specific organic materials or polymers. In the LCD, an electric field is generated in a liquid crystal layer interposed between two display panels. The intensity of the electric field is adjusted to control transmittance of light that passes through the liquid crystal layer, thereby obtaining a desired image.

The flat display device, such as an LCD or an OLED display, includes a display panel including pixels having switching elements and display signal lines, a gate driver that supplies gate signals to gate lines among the display signal lines so as to turn on/off the switching elements of the pixels, a gray voltage generator for generating a plurality of gray voltages, a data driver for selecting a voltage corresponding to image data from the gray voltages as a data voltage and applying the data voltage to a data line among the display signal lines, and a signal controller for controlling the above elements.

In addition, electronic devices such as a mobile phone include the display device to display an operational state and result of the electronic device. The electronic device usually includes a microprocessor unit ("MPU") corresponding to a central processing unit ("CPU").

As a small display device used for mobile phones, etc., a dual display device having outer and inner display panel parts is being actively developed. The dual display device includes a main display panel mounted at an inner side, a sub-display panel mounted at an outer side, a driving flexible printed circuit film ("FPC") having wiring for transferring an input signal, and an integration chip for controlling them.

The integration chip receives an image signal and various control signals from the MPU, and various terminals for receiving and outputting the signals are provided to the integration chip and the MPU. However, as the number of terminals increases, space becomes limited, and the electrical device is vulnerable to static electricity.

BRIEF SUMMARY OF THE INVENTION

The present invention reduces the number of terminals for transmitting and receiving signals between an integration chip and a microprocessor unit ("MPU") to reduce a spatial limitation of the integration chip and the MPU, and to prevent electrostatic damage ("ESD") in a display device and an electronic device including the display device.

An exemplary electronic device according to embodiments of the present invention includes a central processing unit ("CPU"), first and second display panels, and first and second display panel drivers. The CPU provides an image signal and an input control signal. The first and second display panels respectively display images. The first and second display panel drivers drive the first and second display panels according to the image signal and the input control signal. The CPU includes an interface transmission unit outputting an interface signal to control the first and second display panel drivers. The first and second display panel drivers respectively include first and second interface receiving units receiving the interface signal from the interface transmission unit. The interface signal includes a display panel selection bit and a data bit.

The input control signal may include a main clock signal, and the main clock signal may be input to the first and second interface receiving units, respectively. The display panel selection bit may be output before the data bit is output. One of the first and second display panels may be selected by the display panel selection bit.

The electronic device may further include first and second light source units respectively providing light to the first and second display panels, and first and second light source drivers respectively controlling the first and second light source units. The first and second light source units respectively may include third and fourth interface receiving units receiving the interface signal from the interface transmission unit. The interface signal may further include a light source selection bit. The main clock signal may be input to the third and fourth interface receiving units, respectively. One of the first and second light source units may be selected by the light source selection bit. The first light source unit may be selected by the light source selection bit when the first display panel is selected by the display panel selection bit, and the second light source unit may be selected by the light source selection bit when the second display panel is selected by the display panel selection bit. The light source selection bit may be output before the data bit is output. The data bit may include a command value controlling one of the first display panel driver, the second display panel driver, the first light source driver, and the second light source driver.

The interface transmission unit and the first to fourth interface receiving units may respectively be serial peripheral interface ("SPI") devices. The interface signal may be a serial communication signal.

The first display panel driver, the second display panel driver, the first light source driver, and the second light source driver may be realized as respective single integration circuit ("IC") chips.

A same interface signal may be transmitted to each interface receiving unit of the electronic device, and each interface receiving unit may not include a terminal for receiving an enable signal with the interface signal.

An exemplary display device according to other exemplary embodiments of the present invention includes first and second display panels and first and second display panel drivers. The first and second display panels respectively display images. The first and second display panel drivers receive an image signal and an input control signal and drive the first and second display panels according to received image and input control signals. The first and second display panels respectively include first and second interface receiving units for receiving an interface signal for controlling driving conditions of the drivers. The interface signal includes a display panel selection bit and a data bit.

The input control signal may include a main clock signal, and the main clock signal may be input to the first and second interface receiving units, respectively. The display panel selection bit may be output before the data bit is output.

The display device may further include first and second light source units respectively providing light to the first and second display panels, and first and second light source drivers respectively controlling the first and second light source units. The first and second light source units may respectively include third and fourth interface receiving units receiving the interface signal from an interface transmission unit. The interface signal may further include a light source selection bit. The main clock signal may be respectively input to the third and fourth interface receiving units. The first light source unit may be selected by the light source selection bit when the first display panel is selected by the display panel selection bit, and the second light source unit may be selected by the light source selection bit when the second display panel is selected by the display panel selection bit. The light source selection bit may be output before the data bit is output.

The data bit may include a command value controlling one of the first display panel driver, the second display panel driver, the first light source driver, and the second light source driver.

The first to fourth interface receiving units may respectively be serial peripheral interface ("SPI") devices.

An exemplary method of controlling an electronic device according to still other exemplary embodiments of the present invention, the electronic device including a central processing unit, first and second display panels, and first and second display panel drivers, includes transmitting an image signal and an input control signal from the central processing unit to the first and second display panels, and outputting an interface signal from an interface transmission unit of the central processing unit to first and second interface receiving units of the first and second display panel drivers to control the first and second display panel drivers, wherein the interface signal includes a display panel selection bit and a data bit, the display panel selection bit output prior to the data bit, the display panel selection bit selecting one of the first and second display panels and the data bit including a command value to control one of the first and second display panels as selected by the display panel selection bit.

BRIEF DESCRIPTION OF THE DRAWINGS

The above and other features and advantages of the present invention will become more apparent by describing in further detail exemplary embodiments thereof with respect to the accompanying drawings, in which.

DETAILED DESCRIPTION OF THE INVENTION

Figure 1:
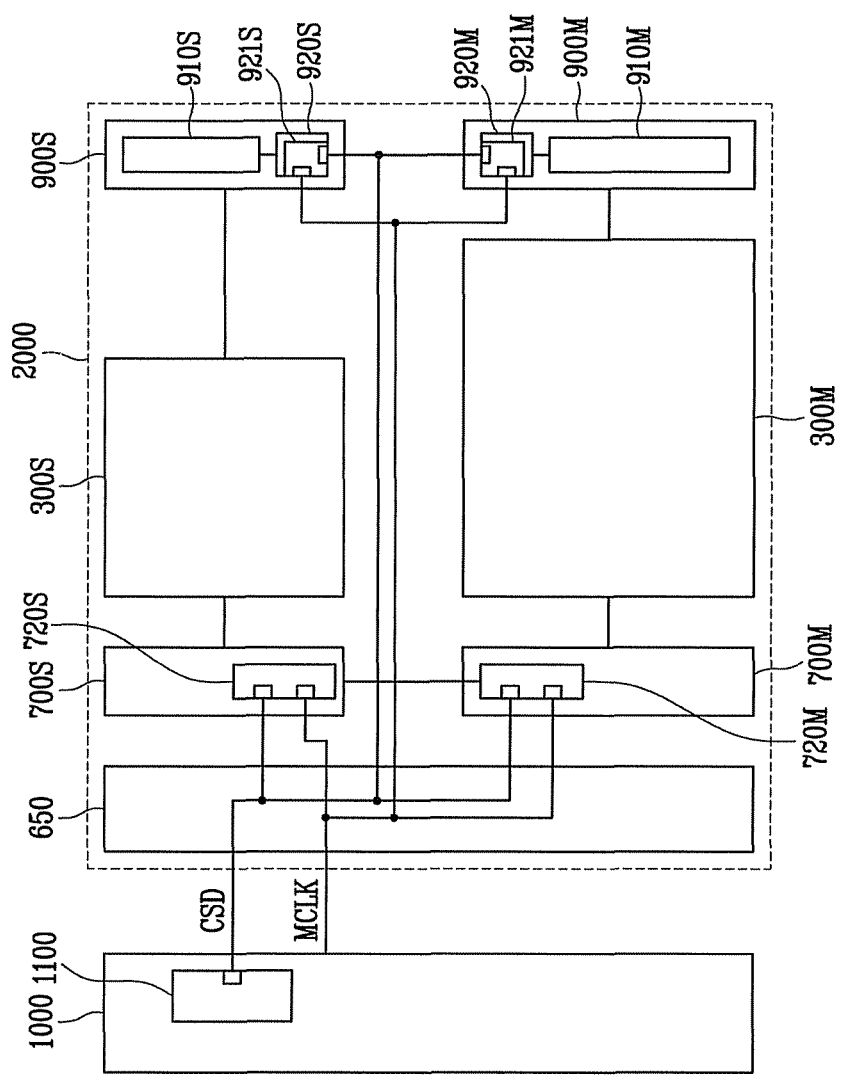
FIG. 1 is a block diagram of an exemplary electronic device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A display device according to the exemplary embodiment of the present invention and an electronic device including the display device will be described with reference to the figures.

Figure 2:
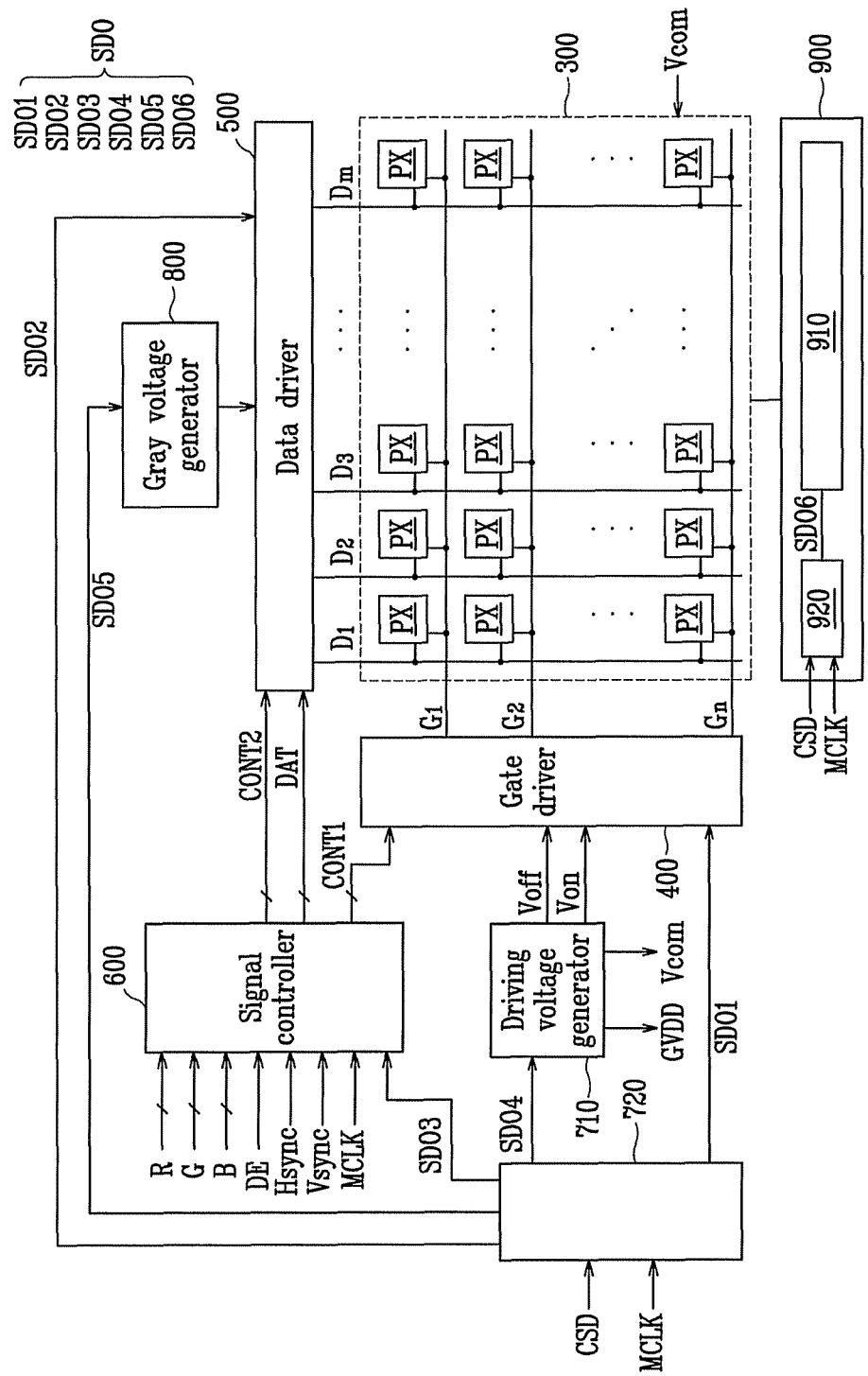
FIG. 2 is a block diagram of an exemplary display device according to an exemplary embodiment of the present invention.
Figure 3:
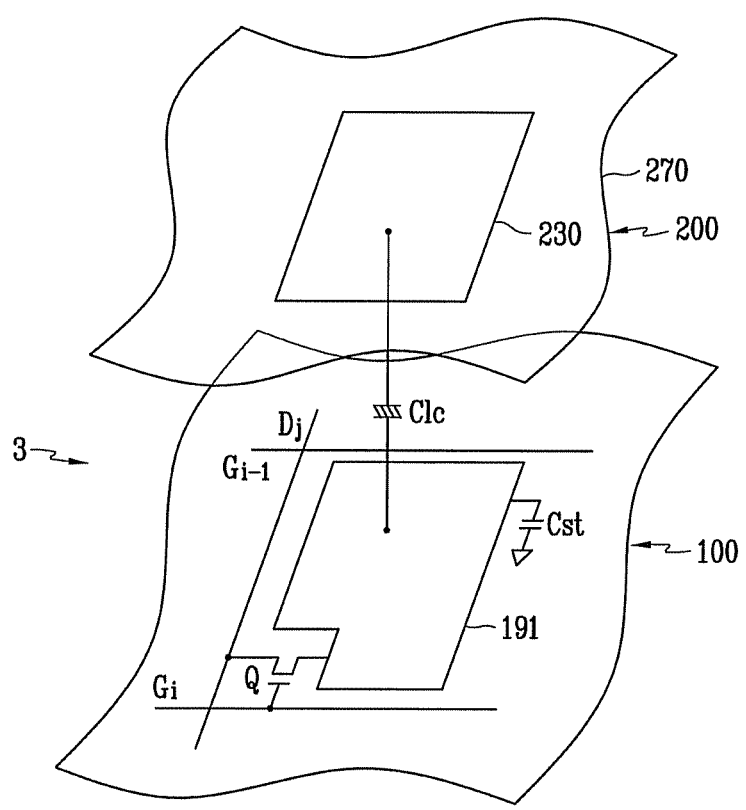
FIG. 3 is an equivalent circuit diagram of one exemplary pixel of the exemplary display device according to an exemplary embodiment of the present invention; and, FIG. 4 is a waveform diagram representing an exemplary interface signal of the exemplary electronic device according to an exemplary embodiment of the present invention.

FIG. 1 is a block diagram of the exemplary electronic device according to an exemplary embodiment of the present invention, FIG. 2 is a block diagram of the exemplary display device according to an exemplary embodiment of the present invention, and FIG. 3 is an equivalent circuit diagram of one exemplary pixel of the exemplary display device according to an exemplary embodiment of the present invention.

As shown in FIG. 1, the electronic device according to an exemplary embodiment of the present invention includes a central processing unit ("CPU") 1000 and a display device 2000 connected to the CPU 1000.

The CPU 1000 controls an operation of the electronic device, and provides input image signals R, G, and B and a control signal to the display device 2000. If the electronic device according to the exemplary embodiment of the present invention is a small or midsize device, such as a mobile phone, the CPU 1000 may actually be a microprocessor unit ("MPU").

The CPU 1000 includes an interface transmitting unit 1100. The interface transmitting unit 1100 outputs an interface signal CSD for controlling a driving condition of the display device 2000. The interface transmitting unit 1100 is a serial peripheral interface ("SPI") device, and exchanges data with peripheral drivers in a serial communication method.

The display device 2000 includes a first display panel 300M, such as a main display panel, a second display panel 300S, such as a subsidiary display panel, a first driver 700M, a second driver 700S, a first lighting unit 900M, a second lighting unit 900S, and a flexible printed circuit ("FPC") film 650.

The first and second display panels 300M and 300S include a display area (not shown) forming a screen and a peripheral area (not shown), and a light blocking layer (not shown) for blocking light may be provided in the peripheral area. The first and second display panels 300M and 300S are disposed on different surfaces of a mobile phone to selectively display images.

The respective display panels 300M and 300S form a liquid crystal panel assembly 300 shown in FIG. 2, are connected to a plurality of display signal lines including a plurality of gate lines $G_1$ to $G_n$ and a plurality of data lines $D_1$ to $D_m$, and include a plurality of pixels PX arranged in a matrix format. Most of the pixels PX and the display signal lines $G_1$ to $G_n$ and $D_1$ to $D_m$ are positioned in display areas of the display panels 300M and 300S, which will be described later.

The FPC film 650 may be provided near a side of the first display panel 300M, and it may include an opening (not shown) for exposing the second display panel 300S when the FPC film 650 is bent. The FPC film 650 may include a plurality of signal lines (not shown) for electrically connecting the FPC film 650 to the CPU 1000 and the first and second drivers 700M and 700S.

Another FPC film (not shown) including signal lines for electrically connecting the first and second display panels 300M and 300S may be provided between the two display panels 300M and 300S.

The first and second display panel drivers 700M and 700S receive an image signal and a control signal from the CPU 1000 through the signal lines provided to the FPC film 650, process the signals, and provide them to the first and second display panels 300M and 300S to control the first and second display panels 300M and 300S.

The first and second display panel drivers 700M and 700S include first and second interface receiving units 720M and 720S, respectively. The first and second interface receiving units 720M and 720S receive an interface signal CSD from the interface transmitting unit 1100 of the CPU 1000. The first and second interface receiving units 720M and 720S are also SPI devices, and they exchange data with the interface transmitting unit 1100 in a serial communication method.

The first and second lighting units 900M and 900S are respectively provided to the display panels 300M and 300S to respectively provide light to the first and second display panels 300M and 300S. The first and second lighting units 900M and 900S respectively include first and second light source units 910M and 910S for emitting light, and first and second light source drivers 920M and 920S for respectively controlling the first and second light source units 910M and 910S.

The first and second light source units 910M and 910S respectively include a plurality of lamps (not shown). For example, a light emitting diode ("LED") may be used for the lamp, however other light sources employed for the light source units 910M and 910S would also be within the scope of these embodiments.

The first and second light source drivers 920M and 920S respectively include third and fourth interface receiving units 921M and 921S. The third and fourth interface receiving units 921M and 921S receive the interface signal CSD from the interface transmitting unit 1100 of the CPU 1000. The third and the fourth interface receiving units 921M and 921S are also SPI devices, and they exchange data with the interface transmitting unit 1100 in a serial communication method.

In addition, the first to fourth interface receiving units 720M, 720S, 921M, and 921S respectively receive a main clock signal MCLK from the CPU 1000.

The display device 2000 according to an exemplary embodiment of the present invention will now be described with reference to FIG. 1, FIG. 2, and FIG. 3. Here, it will be assumed that the display device 2000 is a liquid crystal display ("LCD").

As shown in FIG. 2, the LCD according to the exemplary embodiment of the present invention includes the liquid crystal panel assembly 300, a gate driver 400 connected to the liquid crystal panel assembly 300, a data driver 500, a gray voltage generator 800 connected to the data driver 500, a driving voltage generator 710, an interface receiving unit 720, a signal controller 600, and a lighting unit 900.

While the liquid crystal panel assembly 300 shown in FIG. 2 may be the first and second display panels 300M and 300S shown in FIG. 1, it is not limited thereto, and another flat panel display such as an organic light emitting diode ("OLED") device may be used for the first and second display panels 300M and 300S. Further, the driving voltage generator 710, the interface receiving unit 720, the gray voltage generator 800, the gate driver 400, the data driver 500, and the signal controller 600 shown in FIG. 2 may be the first and second drivers 700M and 700S shown in FIG. 1.

As shown in FIG. 3, in an equivalent circuit of the liquid crystal panel assembly 300, the liquid crystal panel assembly 300 includes a plurality of signal lines and a plurality of pixels PX. In a configuration shown in FIG. 3, the liquid crystal panel assembly 300 includes lower and upper panels 100 and 200 facing each other and a liquid crystal layer 3 provided therebetween.

The signal lines are provided to the lower panel 100, and include a plurality of gate lines $G_1$ to $G_n$ for transmitting gate signals (referred as "scanning signals") and a plurality of data lines $D_1$ to $D_m$ for transmitting a data voltage. The gate lines $G_1$ to $G_n$ are arranged in parallel and extend in a row direction, such as a first direction, and the data lines $D_1$ to $D_m$ are arranged in parallel and extend in a column direction, such as a second direction. The first direction may be substantially perpendicular to the second direction.

The pixels PX are arranged in a matrix format. Each of the pixels PX (e.g., a pixel PX connected to an $i^{th}$ gate line $G_i$ (here, i=1, 2, ..., n) and a $j^{th}$ data line $D_j$ (here, j=1, 2, ..., m) includes a switching element Q connected to the signal lines $G_i$ and $D_j$, a liquid crystal capacitor Clc connected to the switching element Q, and a storage capacitor Cst. In alternative exemplary embodiments, the storage capacitor Cst may be omitted if necessary.

The switching element Q as a three terminal element including a thin film transistor ("TFT") is provided to the lower panel 100, a control terminal thereof, such as a gate electrode, is connected to the gate line $G_i$, an input terminal thereof, such as a source electrode, is connected to the data line $D_j$, and an output terminal, such as a drain electrode, is connected to the liquid crystal capacitor Clc and the storage capacitor Cst.

The liquid crystal capacitor Clc includes a pixel electrode 191 of the lower panel 100 and a common electrode 270 of the upper panel 200 as the terminals of the liquid crystal capacitor Clc, and the liquid crystal layer 3 between the two electrodes 191 and 270 performs as a dielectric material. The pixel electrode 191 is connected to the switching element Q and the common electrode 270 is formed in a former part of the upper panel 200 and receives a common voltage Vcom. In alternative exemplary embodiments, differing from FIG. 3, the common electrode 270 may be provided to the lower panel 100. In this case, at least one of the two electrodes 191 and 270 may be formed in a line or bar shape.

An additional signal line (not shown) provided to the lower panel 100 and the pixel electrode 191 are overlapped while providing an insulator between the additional signal line and the pixel electrode 191 to form the storage capacitor Cst that acts as a subsidiary capacitor of the liquid crystal capacitor Clc, and the additional signal line receives predetermined voltages, such as the common voltage Vcom. Further, the pixel electrode 191 and a previous gate line Gi−1 are overlapped while providing the insulator between the pixel electrode 191 and a previous gate line Gi−1 to form the storage capacitor Cst.

Meanwhile, in order to perform color display, each pixel PX specifically displays one color in a set of colors (spatial division), or the pixels PX alternately display the colors over time (temporal division), which causes the colors to be spatially or temporally synthesized, thereby displaying a desired color. The set of colors may include primary colors, and may include red, green, and blue. As an example of the spatial division, FIG. 3 shows that each pixel PX has a color filter 230 for displaying one of the colors in a region of the upper display panel 200 corresponding to the pixel electrode 191. Unlike the structure shown in FIG. 3, the color filter 230 may be provided above or below the pixel electrode 191 of the lower display panel 100.

At least one polarizer (not shown) for polarizing light is mounted on an outer surface of the liquid crystal panel assembly 300. For example, in one exemplary embodiment, first and second polarized films may be disposed on the lower and upper display panels 100, 200, respectively. The first and second polarized films may adjust a transmission direction of light externally provided into the lower and upper display panels 100, 200, in accordance with an aligned direction of the liquid crystal layer 3. The first and second polarized films may have first and second polarized axes thereof substantially perpendicular to each other, respectively.

The driving voltage generator 710 generates a basic voltage, generates driving voltages for driving the display device based on the basic voltage, and outputs the driving voltages. The driving voltages may include a gate-on voltage Von for turning on the switching element Q of the pixel PX, a gate-off voltage Voff for turning off the switching element Q, a reference voltage GVDD, and a common voltage Vcom.

The gray voltage generator 800 generates all gray voltages relating to transmittance of the pixel PX or a limited number of gray voltages (hereinafter referred to as "reference gray voltages") based on the reference voltage GVDD received from the driving voltage generator 710. The reference gray voltages may include the common voltage Vcom having a positive value and the common voltage having a negative value.

The gate driver 400 is coupled to the gate lines $G_1$ to $G_n$ of the liquid crystal panel assembly 300, receives the gate-on voltage Von and the gate-off voltage Voff from the driving voltage generator 710, combines the gate-on voltage Von and the gate-off voltage Voff to generate the gate signal, and applies the gate signal to the gate lines $G_1$ and $G_n$.

The data driver 500 is coupled to the data lines $D_1$ to $D_m$ of the liquid crystal panel assembly 300, selects the gray voltage received from the gray voltage generator 800, and applies it as a data voltage to the data lines $D_1$ to $D_m$. However, when the gray voltage generator 800 does not provide all the gray voltages but provides the limited number of reference gray voltages, the data driver 500 divides the reference gray voltage and selects a desired data voltage therefrom.

The signal controller 600 controls the gate driver 400 and the data driver 500.

The lighting unit 900 include a light source unit 910 for emitting, and a light source driver 920 for controlling the light source unit 910.

The interface receiving unit 720 receives the interface signal CSD from the CPU 1000, and controls driving conditions of the gate driver 400, the data driver 500, the signal controller 600, the driving voltage generator 710, and the gray voltage generator 800.

At least one of the drivers 400, 500, 600, 710, and 800 or at least one circuit forming the drivers 400, 500, 600, 710, and 800 may be formed outside an integrated chip. In addition, the respective drivers 400, 500, 600, 710, 720, and 800 may be directly mounted on the liquid crystal panel assembly 300 as at least one integrated circuit chip, they may be mounted on an FPC film (not shown) to be attached to the liquid crystal panel assembly 300 as a type of tape carrier package ("TCP"), or they may be mounted on an additional FPC board (not shown). Otherwise, the drivers 400, 500, 600, 710, 720, and 800 may be integrated with the liquid crystal panel assembly 300 along with the signal lines $G_1$ to $G_n$ and $D_1$ to $D_m$ and the TFT switching element Q.

An operation of the display device and the interface signal will be described with reference to FIG. 1 and FIG. 4.

Figure 4:
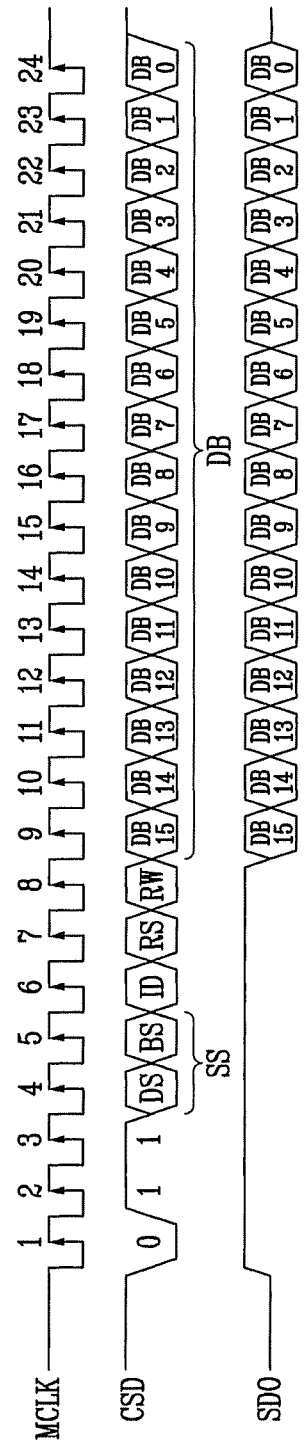

FIG. 4 is a waveform diagram representing an exemplary interface signal of the exemplary electronic device according to an exemplary embodiment of the present invention.

Firstly, the CPU 1000 outputs the main clock signal MCLK and the interface signal CSD.

In one exemplary embodiment, the interface signal CSD includes 24 bits.

First to third bits indicate an identification number of a driving chip, or they are invalid bits that do not affect the operation of the drivers 700S and 700M. First to third bits are illustrated as 011 in FIG. 4.

A fourth bit DS is a display panel selection bit. For example, one of the first display panel 300M and the second display panel 300S shown in FIG. 1 is selected by the fourth bit DS. A fifth bit BS is a light source selection bit. For example, one of the first lighting unit 900M and the second lighting unit 900S shown in FIG. 1 is selected by the fifth bit BS. The fourth bit DS and the fifth bit BS are together referred to as a selection bit SS.

A sixth bit ID is an invalid bit that does not affect the operation of the drivers 700S and 700M.

A seventh bit RS is a register selection bit.

An eighth bit RW is a bit for commanding a read operation or a write operation.

The remaining 16 bits from the ninth to twenty-fourth bits DB15 to DB0 are data bits DB. Collectively, the data bit DB indicates an address of a register when the register selection bit RS is 0, and the data bit DB indicates a command value for controlling a driving condition of the driver when the register selection bit RS is 1.

The interface signal CSD and the main clock signal MCLK are input to the first to fourth interface receiving units 720M, 720S, 921M, and 921S of the respective drivers 700M, 700S, 920M, and 920S. The first to fourth interface receiving units 720M, 720S, 921M, and 921S respectively generate a serial data output signal SDO based on the interface signal CSD and the main clock signal MCLK. The serial data output signal SDO corresponds to the data bit DB of the interface signal CSD, that is, the 16 bits from the ninth bit DB15 to the twenty-fourth bit DB0 of the interface signal CSD.

The first and second interface receiving units 720M and 720S transmit the serial data output signal SDO to the respective drivers 400, 500, 600, 710, and 800 to control the driving conditions thereof. That is, as shown in FIG. 2, the serial data output signal SDO includes first to fifth serial data input signals SDO1 to SDO6, with the first signal SDO1 transmitted to the gate driver 400, the second signal SDO2 transmitted to the data driver 500, the third signal SDO3 transmitted to the signal controller 600, the fourth signal SDO4 transmitted to the driving voltage generator 710, the fifth signal SDO5 transmitted to the gray voltage generator 800, and the sixth signal SDO6 transmitted to the light source unit 910 from the light source driver 920.

The respective third and fourth interface receiving units 921M and 921S transmit the data output signal SDO to the first and second light source units 910M and 910S to control the first and second light source units 910M and 910S.

The CPU 1000 provides the input image signals R, G, and B and the input control signals to the signal controller 600.

The input image signals R, G, and B include luminance information of each pixel PX, and the luminance has a predetermined number of grays (e.g., 1024 (=$2^{10}$), 256 (=$2^{8}$) or 64 (=$2^{6}$)).

The input control signal may include a vertical synchronization signal Vsync, a horizontal synchronizing signal Hsync, a main clock signal MCLK, and a data enable signal DE.

The signal controller 600 appropriately processes the input image signals R, G, and B according to an operational condition of the liquid crystal panel assembly 300 based on the input video signals R, G, and B and the input control signals, generates a gate control signal CONT1 and a data control signal CONT2, transmits the gate control signal CONT1 to the gate driver 400, and transmits the data control signal CONT2 and a processed video signal DAT to the data driver 500.

The gate control signal CONT1 includes a scan start signal STV for starting a scan operation, and at least one clock signal for controlling an output period of a gate-on voltage Von. Further, the gate control signal CONT1 may include an output enable signal OE for limiting a duration time of the gate-on voltage Von.

The data control signal CONT2 includes a horizontal synchronizing start signal STH for informing transmission start of the digital video signal DAT for a pixel PX of one row, and a load signal LOAD and a data clock signal HCLK for applying an analog data voltage to the data lines $D_1$ to $D_m$. Further, the data control signal CONT2 may include an inversion signal RVS for inverting data voltage polarity with respect to the common voltage Vcom (hereinafter, the data voltage polarity with respect to the common voltage Vcom will be referred to as a "data voltage polarity".)

According to the data control signal CONT2 from the signal controller 600, the data driver 500 receives the digital video signal DAT for a pixel PX of one row, selects a gray voltage, from the gray voltage generator 800, corresponding to each digital video signal DAT, and converts the digital video signal DAT to an analog data voltage and applies the analog data voltage to the corresponding data lines $D_1$ to $D_m$.

The gate driver 400 applies the gate-on voltage Von to the gate lines G1 to Gn according to the gate control signal CONT1 from the signal controller 600 to turn on the switching element Q coupled to the gate lines G1 to Gn. Thereby, the data voltage applied to the data lines D1 to Dm is applied to the corresponding pixel PX through the turned on switching element Q.

A difference between the data voltage applied to the pixel PX and the common voltage Vcom is expressed as a charged voltage of the liquid crystal capacitor Clc (i.e., a pixel voltage). An arrangement of liquid crystal molecules within the liquid crystal layer 3 varies according to a size of the pixel voltage, and therefore polarized light penetrating the liquid crystal layer 3 varies. The variation of the polarized light is expressed as a transmittance variance of the light, and therefore the pixel PX expresses the luminance expressed by the grayscale of the video signals DAT.

The above operation is repeatedly performed having a horizontal period 1H corresponding to one period of the horizontal synchronization signal Hsync and the data enable signal DE, the gate-on voltage Von is sequentially applied to all the gate lines $G_1$ to $G_n$, and the data voltage is applied to all the pixels PX so as to display an image of one frame.

After one frame ends, a subsequent frame is started, and a state of the inversion signal RVS applied to the data driver 500 to invert the polarity of the data voltage applied to each pixel PX from the polarity of a previous frame is controlled, which is referred to as "frame inversion". In this case, in one frame, the polarity of the data voltage flowing through one data line may be periodically changed according to characteristics of the inversion signal RVS (e.g., row inversion and dot inversion), or the polarities of the data voltage applied to one pixel row may be different (e.g., column inversion and dot inversion).

The interface signal CSD of the electronic device according to the exemplary embodiment of the present invention includes the display panel selection bit DS and the light source selection bit BS, collectively referred to as the selection bit SS, in addition to the data bit DB, as shown in FIG. 4. If the interface signal CSD included only the data bit DB, then the CPU 1000 would be required to separately transmit four interface signals respectively including the data bit DB to the first to fourth interface receiving units 720M, 720S, 921M, and 921S, and respective enable signals of the four interface signals would be required to be separately transmitted. In addition, the respective interface receiving units 720M, 720S, 921M, and 921S would be required to separately receive the interface signals including the data bit DB and the enable signals thereof. Accordingly, it would be required to provide input and output terminals for transmitting and receiving such signals.

However, the electronic device according to the exemplary embodiment of the present invention may control the four interface receiving units 720M, 720S, 921M, and 921S by using one interface signal CSD including the selection bit SS, which includes the display panel selection bit DS and the light source selection bit BS, and the data bit DB. Accordingly, the number of output terminals of the CPU 1000 and the number of input and output terminals of the drivers 700M, 700S, 920M, and 920S may be considerably reduced.

In addition, rather than outputting an additional serial clock signal, the interface transmitting unit 1100 of the CPU 1000 inputs the main clock signal MCLK, which is input from the CPU 1000 to the signal controller 600, to the first to fourth interface receiving units 720M, 720S, 921M, and 921S. Thereby, an output terminal for outputting the serial clock signal may be omitted from the interface transmitting unit 1100.

As described, when the number of input and output terminals of the interface transmitting unit 1100 and the interface receiving units 720M, 720S, 921M, and 921S is reduced, a spatial limitation in designing the interface transmitting unit 1100 and the interface receiving units 720M, 720S, 921M, and 921S may be reduced.

In addition, since electrostatic damage ("ESD") may increase as the number of input and output terminals of the interface transmitting unit 1100 and the interface receiving units 720M, 720S, 921M, and 921S increases, an additional design is required to solve an ESD problem. However, according to the exemplary embodiment of the present invention, since the number of input and output terminals is reduced and the ESD is reduced, a burden on the additional design may be reduced.

Thus, according to exemplary embodiments of the present invention, the number of input and output terminals for receiving and transmitting signals in the electronic device including the display device is reduced, a spatial limitation may be solved, and ESD may be prevented. A method of controlling the electronic device is also made possible.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electronic device comprising:
a central processing unit providing an image signal and an input control signal;
first and second display panels that respectively display images;
first and second display panel drivers that drive the first and second display panels according to the image signal and the input control signal;
first and second light source units that respectively provide light to the first and second display panels; and
first and second light source drivers that respectively control the first and second light source units,
wherein the central processing unit comprises an interface transmission unit outputting an interface signal controlling the first and second display panel drivers,
the first and second display panel drivers respectively comprise first and second interface receiving units,
the first interface receiving unit and the second interface receiving unit each directly and simultaneously receive the interface signal including a display panel selection bit and a data bit following the display panel selection bit in a same packet as the display panel selection bit from the interface transmission unit,
the input control signal comprises a main clock signal, and the main clock signal is input to the first and second interface receiving units, respectively,
the first and second light source units respectively comprise third and fourth interface receiving units that receive the interface signal from the interface transmission unit,
the interface signal further comprises a light source selection bit,
the main clock signal is input to the third and fourth interface receiving units, respectively,
one of the first and second light source units is selected by the light source selection bit,
the first light source unit is selected by the light source selection bit when the first display panel is selected by the display panel selection bit, and the second light source unit is selected by the light source selection bit when the second display panel is selected by the display panel selection bit, and
the light source selection bit is output before the data bit is output.

2. The electronic device of claim 1, wherein one of the first and second light source units is selected by the light source selection bit, and
wherein the data bit comprises a command value to control one of the first display panel driver, the second display panel driver, the first light source driver, and the second light source driver.

3. The electronic device of claim 1, wherein the interface transmission unit and the first to fourth interface receiving units respectively comprise serial peripheral interface devices, and
wherein the interface signal comprises a serial communication signal.

4. The electronic device of claim 1, wherein the first display panel driver, the second display panel driver, the first light source driver, and the second light source driver are formed as respective single integration circuit chips.

5. The electronic device of claim 1, wherein the display panel selection bit is output before the data bit is output, and
wherein one of the first and second display panels is selected by the display panel selection bit.

6. A display device comprising:
first and second display panels that respectively display images;
first and second display panel drivers that drive the first and second display panels, Respectively;
first and second light source units that respectively provide light to the first and second display panels; and
first and second light source drivers that respectively control the first and second light source units,
wherein the first and second display panels respectively comprise first and second interface receiving units, the first interface receiving unit and the second interface receiving unit each directly and simultaneously receive a same interface signal including a display panel selection bit and a data bit following the display panel selection bit in a same packet as the display panel selection bit to control driving conditions of the drivers,
the input control signal comprises a main clock signal, and the main clock signal is input to the first and second interface receiving units, respectively,
the first and second light source units respectively comprise third and fourth interface receiving units that receive the interface signal, the interface signal further comprises a light source selection bit, the first light source unit is selected by the light source selection bit when the first display panel is selected by the display panel selection bit, and the second light source unit is selected by the light source selection bit when the second display panel is selected by the display panel selection bit, and the light source selection bit is output before the data bit is output.

7. The display device of claim 6, wherein the display panel selection bit is output before the data bit is output.

8. The display device of claim 6, wherein the data bit comprises a command value to control one of the first display panel driver, the second display panel driver, the first light source driver, and the second light source driver.

* * * * *